G. BUSCHMANN & J. H. BROWN.
Back-Lash Spring for Mill-Spindles.

No. 198,078. Patented Dec. 11, 1877.

Witnesses:
L. N. Seely
P. D. Dyer

Inventors:
Gustav Buschmann
John H. Brown
by Geo. H. Dyer & Co.
Atty's

UNITED STATES PATENT OFFICE.

GUSTAV BUSCHMANN AND JOHN H. BROWN, OF CHICAGO, ILLINOIS.

IMPROVEMENT IN BACKLASH-SPRINGS FOR MILL-SPINDLES.

Specification forming part of Letters Patent No. 198,078, dated December 11, 1877; application filed September 19, 1877.

*To all whom it may concern:*

Be it known that we, GUSTAV BUSCHMANN and JOHN H. BROWN, both of Chicago, in the county of Cook and State of Illinois, have invented certain Improvements in Backlash-Springs for Mill-Spindles, of which the following is a specification:

The nature of our invention relates to springs which are interposed as carriers between the driving-gear and the spindle to be driven, for the purpose of equalizing the motion; and it consists in the construction and arrangement of two helical springs within a casing, and so placed apart and clear of the top and bottom plates of said casing that each spring is free and noiseless in its action, and that both springs will have even shares of the power to be exerted.

Figure 1:
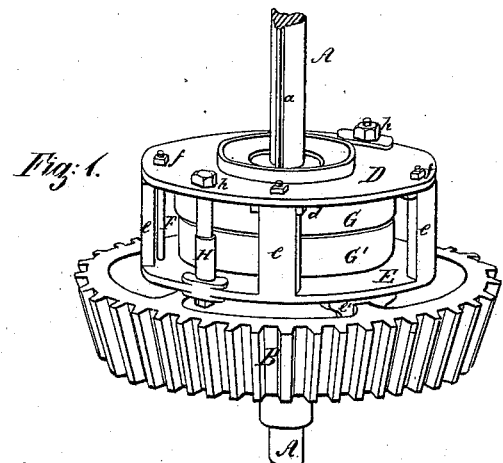
Figure 2:
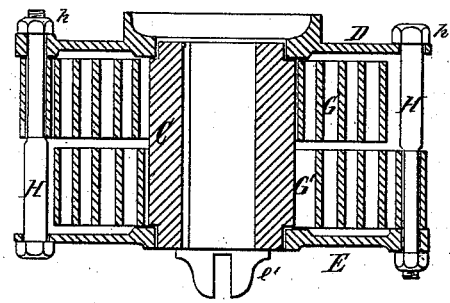
Figure 3:
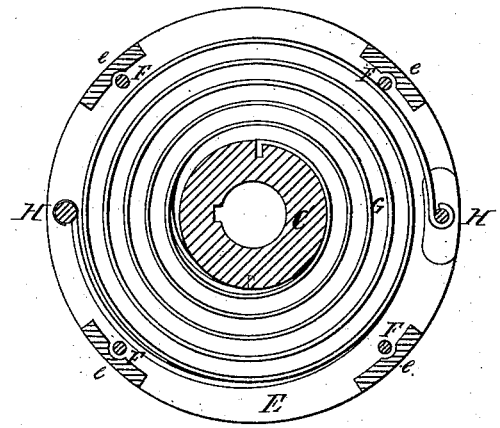

In the drawing, Figure 1 is an exterior perspective view of our invention when applied to a mill-spindle. Fig. 2 is a cross-section through center of springs and casing, and Fig. 3 is a sectional plan of the same.

A is the mill-spindle, and B the pinion, which is fitted upon an intermediate conical sleeve secured on the spindle in the usual manner, and upon which it turns loose. C is the hub, bored to fit upon said spindle A, and made to rotate therewith by a feather, $a$. D and E are two annular plates with swell-centers, bored to fit upon the shouldered ends of hub C, which are rigidly secured together by a series of legs, $e$, projecting from the face edge of plate E, and fitted into sockets $d$ on the face of plate D, and by bolts F passed through both plates and tightened by nuts $f$. The lower plate E has pendent bifurcated lugs $e'$, which will couple with the arms of pinion B.

G and G' are helical springs, the inward ends of which have a rectangular bend, to be inserted into cavities in hub C, thus coupled therewith. The exterior ends of said springs are eye-shaped, and are secured by bolts H, having nuts $h$, and being passed through holes in plates D and E, and that portion of the shank of said bolts H which is passed through the eye of the spring is smaller in diameter than the rest of said bolt, thus forming a shoulder, between which and a boss on the plates the eyed end of the spring is supported and held.

The springs by this arrangement are placed sufficiently off the faces of the plates D and E, and at such distance apart that they will not touch, and therefore will be noiseless, and cannot interfere with each other during their action.

The helix of both springs starts and terminates from opposite sides of the hub C, thereby distributing the strain upon the casing, and resisting the thrust imparted upon the springs at equal shares.

Motion imparted from the pinion to the spindle is intercepted first by the springs, whereby said motion is so equalized that irregularities, either of the prime motor or in the resistance to the millstone-runner, are of no consequence.

We are aware that backlash-springs have been in use heretofore, and also such with helical springs, the arrangement of which was such, however, that the springs did not have the free motion as in ours, and therefore could not give full satisfaction.

What we claim as our invention is—

The helical springs G and G', placed apart and within a casing, consisting of hub C, top and bottom plates D and E, and bolts H, all constructed and arranged substantially as described, and to operate in combination with spindle A and pinion B, in the manner herein set forth.

GUSTAV BUSCHMANN.
JOHN H. BROWN.

Witnesses:
ALEXANDER F. DALRYMPLE,
W. H. LEADER.